Patented June 5, 1951

2,555,614

UNITED STATES PATENT OFFICE 2,555,614

DERIVATIVES OF 5-(AMINO-PHENYLSULFONAMIDO)-ISOXAZOLES

Norbert Steiger, Nutley, N. J., assignor to Hoffmann-La Roche Inc., Nutley, N. J., a corporation of New Jersey No Drawing. Application March 11, 1949, Serial No. 81,017

9 Claims. (Cl. 260—239.9)

The present invention relates to new derivatives of 5-(amino-phenylsulfonamindo)-isoxazoles and their method of production. More particularly, the invention relates to 5-[(3-hydroxy-4-oxo-1,4-dihydro-(R)$_n$ - 1 - naphthylidene-amino) - phenylsulfonamido]-3R$_1$, 4R$_2$ - isoxazoles having the following formula:

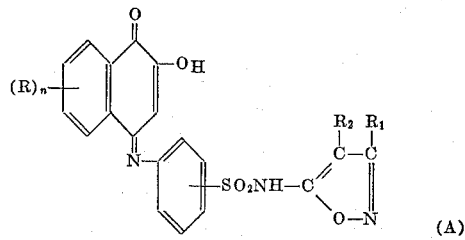

(A)

In the above formula, R stands for hydrogen, or a sulfo radical by which term is also included the sulfo salt, $n$ being a small integer, such as 1, 2 or 3. R$_1$ and R$_2$ when taken separately represent hydrogen and a lower alkyl radical, at least one of R$_1$ and R$_2$ being a lower alkyl radical, as for example, methyl, ethyl, propyl, isopropyl, butyl, isobutyl, amyl, isoamyl, and the like; and when taken jointly R$_1$ and R$_2$ represent a tetramethylene radical.

As will be understood from the above formula, the naphthylidene nucleus may be unsubstituted, or substituted in the 5, 6, 7 or 8 positions as, for example, by one or more sulfo radicals. The phenyl nucleus may also contain substitutents, such as a lower alkyl or lower alkoxy radical, for example, methyl, ethyl, propyl, methoxy, ethoxy, propoxy, and the like radicals. The new compounds are of interest in combatting virus infections.

The new 5-[(3-hydroxy-4-oxo-1,4-dihydro-(R)$_n$-naphthylidene-amino)phenylsulfonamido]-3R$_1$, 4R$_2$-isoxazoles represented by formula (A) can, in general, be prepared by reacting a 1,2-naphthoquinone-sulfo compound (B) having at least one sulfo group in the 4-position, preferably in salt form, with a 5-(aminophenylsulfonamido)-3R$_1$, 4R$_2$-isoxazole (C) which may also contain lower alkyl and lower alkoxy substituents in the phenyl nucleus. The process can be illustrated schematically by the following equation:

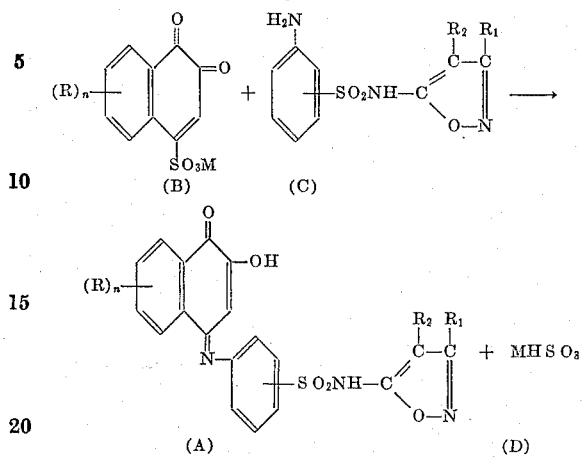

In the above formulae, R, R$_1$, R$_2$ and $n$ have the same significance already assigned thereto, and M stands for hydrogen or a salt-forming group such as an alkali metal, for example, sodium, potassium, lithium, or ammonium.

By employing 5-(amino-phenylsulfonamido)-isoxazoles, where the amino group is para, meta or ortho to the —SO$_2$NH— radical, there are obtained the corresponding 5-[N$^4$-(3-hydroxy-4-oxo-1,4-dihydro-(R)$_n$-naphthylidene) - sulfanilamido]-3R$_1$, 4R$_2$-isoxazoles, 5-[3-(3-hydroxy-4-oxo - 1,4-dihydro-(R)$_n$-naphthylidene - amino)-phenylsulfonamido]-3R$_1$,4R$_2$-isoxazoles, and 5-[2-(3-hydroxy-4-oxo-1,4 - dihydro-(R)$_n$-naphthylidene - amino) - phenylsulfonamido] - 3R$_1$, 4R$_2$-isoxazoles.

The process can be carried out under any suitable conditions. In a preferred method of practicing the process, a 5-sulfanilamido-3R$_1$, 4R$_2$-isoxazole (C) is dissolved in a dilute mineral acid, as for example, hydrochloric or sulfuric acid at a temperature of about 20–80° C., and the resulting solution of the acid addition salt of the isoxazole formed is added to an aqueous suspension or sludge of a 1,2-naphthoquinone-sulphonate (B), while stirring or agitating. The compounds (A) wherein $n$ is zero, being insoluble in water, precipitate and can be isolated by simple filtration. On the other hand, the compounds (A) which contain at least one sulfo group are soluble in either water, sodium acetate, or weak sodium carbonate solutions. When soluble in the reaction medium, they can be recovered by salting out or any other suitable method. The compounds (A) usually have a red or brownish color.

I find it advantageous to add hydrogen peroxide to the reaction mixture to oxidize the bisulfite (D) formed during the reaction. This converts the bisulfite to the stable bisulfate, thereby preventing side reactions.

The following examples will serve to illustrate the invention:

Example 1

*5-N$^4$-(3-hydroxy-4-oxo - 1,4 - dihydro-naphthylidene)-sulfanilamido]-3,4-dimethyl-isoxazole*

13.4 grams of 5-sulfanilamido-3,4-dimethyl-isoxazole were dissolved in 30 cc. of concentrated (30–37 per cent) hydrochloric acid and 100 cc. of water at 70° C. The clear solution was dropped in a well-agitated sludge of 19 grams of 1,2-naphthoquinone-4-potassium sulfonate in 350 cc. of water. The condensation product precipitated with a red color. After stirring for fifteen minutes there were added 6 cc. of hydrogen peroxide (30 per cent by volume) diluted with 25 cc. of ice water. Stirring was continued for two hours. The mixture was then filtered by suction. The filter cake was washed on the funnel with water, sucked dry, and further dried at 80° C. to obtain the above-entitled compound.

EXAMPLE 2

*5 - [N$^4$-(3-hydroxy-4-oxo-1,4-dihydro-7-sulfo-1-naphthylidene)-sulfanilamido]-3,4 - dimethyl-isoxazole potassium salt*

40.2 grams of 5-sulfanilamido-3,4-dimethyl-isoxazole were dissolved in 90 cc. of concentrated hydrochloric acid and 300 cc. of water at 70° C. The solution was run into a well-stirred sludge of 78 grams of 1,2-naphthoquinone-4,6-dipotassium sulfonate in 600 cc. of water. The condensation product precipitated with a red color. After stirring for fifteen minutes, there were added 20 cc. of hydrogen peroxide (30 per cent by volume) diluted with 75 cc. of ice water. Stirring was continued for four hours. The mixture was then filtered by suction and washed with ice water on the funnel. The filter cake was dried first at 40° C. and then finally at 80° C. to obtain the above-entitled compound.

The compound is a bluish-red powder which is soluble in dilute sodium acetate with an orange-red color. The color of the product is concentrated (95 per cent) sulfuric acid solution is bright carmine red.

A stable 3 per cent solution of the compound was prepared as follows:

3 grams of the powdered compound were mixed with 1 gram of sodium acetate and 0.8 gram of crystalline sodium carbonate. Water (75 cc.) was added and the solution heated a short time to the boil. It was filtered and the filtrate made up to 100 cc.

EXAMPLE 3

*5 - [N$^4$-(3-hydroxy - 4 - oxo-1,4-dihydro-6-sulfo-1 - naphthylidene) - sulfanilamido] - 3,4 - dimethyl-isoxazole potassium salt*

78 grams of 1,2-naphthoquinone-4,7-dipotassium sulfonate and 40.2 grams of 5-sulfanilamido-3,4-dimethyl-isoxazole were reacted in the same manner as described in Example 2. There was thus obtained the above-entitled compound. It is very soluble in water, forming a red-orange colored solution. The color of a concentrated sulfuric acid solution is a bright red violet.

By reacting 36 grams of 1,2-naphthoquinone-4,8-disodium sulfonate instead of 1,2-naphthoquinone-4,7-dipotassium sulfonate with 20 grams of 5-sulfanilamido-3,4-dimethyl-isoxazole, in the same manner as described in Example 2, there was obtained 5-[N$^4$-(3-hydroxy-4-oxo-1,4-dihydro-5-sulfo- 1 -naphthylidene) - sulfanilamido]-3,4-dimethyl-isoxazole-sodium salt. This compound is readily soluble with a reddish brown color in water while in concentrated H$_2$SO$_4$ the color is red.

EXAMPLE 4

*5-[N$^4$-(1,4-dihydro - 3 - hydroxy-4-oxo-5,7-disulfo-1-naphthylidene) - sulfanilamido] - 3,4 - dimethyl-isoxazole disodium salt*

12 grams of 1-amino-2-hydroxy-naphthylene-4,6,8-trisulfonic acid were added to 10 grams of nitric acid (70 per cent) and 15 grams of ice with external cooling. The temperature was permitted to rise to 25° C. When the oxidation was completed, a clear brownish yellow solution resulted which was diluted with 30 cc. of cold water. This solution contained 1,2 - naphthoquinone-4,6,8-trisulfonic acid.

To the solution were added while agitating, five grams of 5-sulfanilamido-3,4-dimethyl-isoxazole which went into solution. The reaction mixture turned a deep red color. 2 cc. of hydrogen peroxide (30 per cent by volume) and 10 cc. of ice water were added and the mixture stirred for two hours. Then 10 grams of sodium chloride were added, whereupon the above-entitled compound precipitated. It was filtered and the filter cake dried at 80° C. A red-brown powder, soluble in water, was obtained. The color in concentrated sulfuric acid solution is red-brown.

EXAMPLE 5

*5 - [N$^4$-(1,4-dihydro - 3 - hydroxy-4-oxo-7-sulfo-1-naphthylidene)-sulfanilamido] - 3,4 - tetramethylene-isoxazole potassium salt*

15 grams of 5-sulfanilamido-3,4-tetramethylene-isoxazole were dissolved in 30 cc. of concentrated hydrochloric acid and 150 cc. of water at 70–80° C. The solution thus obtained was added to a sludge of 1,2-naphthoquinone-4,6-dipotassium sulfonate while stirring. Then 10 cc. of 30 per cent by volume hydrogen peroxide diluted with 25 cc. of ice water were added. Stirring was continued for five hours. A red-brown precipitate resulted which was filtered off, washed with ice water and dried. The precipitate was the above-entitled compound. When dried, it forms a red-brown powder which is soluble in dilute sodium acetate with a red-orange color. The color in concentrated sulfuric acid solution is a bright bluish red.

A 3 per cent stable solution was prepared as follows:

3 grams of the compound of the above structural formula were dissolved together with 1 gram of crystalline sodium acetate and 0.4 gram of sodium carbonate in 80 cc. of water at 100° C. The solution was filtered at 100° C. and made up to 100 cc.

The 5 - sulfanilamido-3,4-tetramethylene-isoxazole was prepared in the following manner:

141 grams of sodium oxymethylene-cyclohexanone, 80 grams of hydroxylamine sulfate, 500 cc.

of water and 10 cc. of 10N sulfuric acid were stirred together in a round-bottom flask. The mixture was distilled and the 4,5-tetramethylene-isoxazole formed was separated from the water and dried with calcium chloride.

16 grams of sodium were dissolved in 200 cc. of alcohol and 85 grams of the 4,5-tetramethylene-isoxazole were added gradually. The reaction proceeded instantaneously with evolution of heat and crystallization of the sodium enolate of cyano-cyclohexanone that formed. After cooling, the material was filtered under suction.

55 grams of hydroxylamine sulfate and all the sodium enolate of cyano-cyclohexanone were dissolved in 200 cc. of water and the solution refluxed. An oil separated on the top of the mixture. After 30 minutes, 200 cc. of 3N sodium hydroxide solution were added and refluxing continued for 15 minutes. On cooling, 5-amino-3,4-tetramethylene - isoxazole crystallized completely. It was filtered under suction and washed on the filter with cold water. Recrystallized from water it had a M. P. of 119–120° C.

54 grams of the 5-amino-3,4-tetramethylene-isoxazole were mixed with 50 cc. of dry pyridine, 50 cc. acetone, and 100 grams of p-acetamino-benzenesulfonyl chloride were added in portions at 30–50° C. The mixture was left standing for fifteen hours and upon addition of warm water, 5-(p-acetamino-phenylsulfonamido)-3,4 - tetramethylene - isoxazole, precipitated and was filtered under suction. It was purified by dissolving in dilute ammonia, filtering the solution and reprecipitating by the addition of hydrochloric acid. The compound was saponified with five times the amount of 3N sodium hydroxide solution for one hour at 95° C. and the solution was acidified with acetic acid, whereby there was precipitated 5-sulfanilamido-3,4-tetramethylene-isoxazole.

EXAMPLE 6

*5 - [N4-(1,4-dihydro-3-hydroxy-4-oxo-6-sulfo-1-naphthylidene) - sulfanilamido] - 3,4 - tetra - methylene-isoxazole potassium salt.*

15 grams of 5-sulfanilamido-3,4-tetramethylene-isoxazole were reacted with 20 grams of 1,2-naphthoquinone - 4,7 - dipotassium - sulfonate in the same manner as described in Example 5. The above-entitled compound was formed. It has a red color and is soluble in water with an orange-brown color. Its color in concentrated sulfuric acid solution is a bright bluish-red.

EXAMPLE 7

*5-[N4-(1,4-dihydro-3-hydroxy-4-oxo-5,7-disulfo-1-naphthylidene) - sulfanilamido] - 3,4-tetra-methylene-isoxazole disodium salt*

12 grams of 1-amino-2-hydroxy-naphthylene-4,6,8-trisulfonic acid were added to 10 grams of nitric acid (70 per cent) and 15 grams of ice with external cooling. The temperature was permitted to rise to 25° C. When the oxidation was completed, the reaction solution was diluted with 30 cc. of ice water. This solution contained 1,2-naphthoquinone-4,6,8-trisulfonic acid.

To the solution were added with agitation 5 grams of 5-sulfanilamido-3,4-tetramethylene-isoxazole. The reaction mixture turned a deep red color. 2 cc. of hydrogen peroxide (30 per cent by volume) and 10 cc. of ice water were added and the mixture stirred for four hours. Then 12 grams of sodium chloride were added, whereupon the above-entitled compound precipitated. It was filtered and dried at 80° C. The dry substance had a red-brown color and was very soluble in water.

EXAMPLE 8

*5 - [N4-(1,4-dihydro-3-hydroxy-4-oxo-7-sulfo-1-naphthylidene) - sulfanilamido] - 3 - isobutyl-isoxazole potassium salt*

9 grams of 5-sulfanilamido-3-isobutyl-isoxazole were dissolved in 15 cc. of hydrochloric acid and 60 cc. of water at 80° C. and added to a sludge of 15 grams of 1,2-naphthoquinone-4,6-dipotassium-sulfonate in 150 cc. of water with agitation. The condensation product precipitated. 4 cc. of hydrogen peroxide, (30 per cent by volume) diluted with 25 cc. of water were added and stirring was continued for four hours. The mixture was then filtered and the filter cake dried at 80° C. The product thus obtained is the above-entitled compound. It is a red powder. It dissolves in water forming a brown-colored solution. The color of a concentrated sulfuric acid solution is brownish red.

The 5-sulfanilamido-3-isobutyl-isoxazole was prepared in the following manner:

105 grams of granulated sodium in xylene were partly transformed to sodium ethylate by adding 250 cc. of alcohol gradually under stirring. A mixture of 400 cc. of isobutyl-methyl-ketone and 240 grams of methyl formate was added in small portions while stirring and cooling. A thick crystallization of sodium-oxymethylene methyl isobutyl ketone formed. This compound was suspended in 500 cc. of alcohol, and 500 cc. of water, 320 grams of crystallized hydroxylamine sulfate and 400 grams of 10 per cent sulfuric acid were added. The mixture was stirred vigorously and the temperature was allowed to rise to 80° C. A spontaneous reaction occurred and when it had ceased the mixture was steam distilled. The 5-isobutyl-isoxazole thus formed was separated as an oily layer from the aqueous layer of distillate, and purified by distillation in vacuo at 90–95° C./40 mm.

23 grams of sodium were dissolved in 600 cc. of methanol and 125 grams of 5-isobutyl-isoxazole were gradually added under reflux to the solution. After the spontaneous reaction had ceased, the solution was evaporated in vacuo. The crystalline residue consisted of the sodium enolate of isovaleryl-acetonitrile.

72 grams of hydroxylamine hydrochloride, 125 cc. of water and 125 cc. of alcohol were added under stirring to the sodium enolate of isovaleryl-acetonitrile. The mixture became warm and separated into two layers. To complete the reaction, the mixture was heated on a steam bath for one hour. After cooling an oil was separated from the aqueous layer by the addition of ether and the ether extract shaken repeatedly with 15 to 20 per cent hydrochloric acid. The hydrochloric acid extracts were made alkaline with sodium hydroxide solution or ammonia to obtain 3-isobutyl-5-amino-isoxazole which first separated as an oil that later solidified to an aggregation of large shiny plates. After washing with water, drying and recrystallization from ether-petroleum ether, the compound had a M. P. of 72–73° C.

25 grams of the 3-isobutyl-5-amino-isoxazole were dissolved in a mixture of 25 cc. of pyridine and 25 cc. of acetone, and 50 grams of p-acet-amino-benzenesulfonyl chloride were added gradually under cooling in order to maintain a temperature of 20–30° C. After five hours, water was added and the precipitate left standing for recrystallization. The crystalline mass was filtered under suction, dissolved in cold 3N sodium hydroxide solution, filtered from undissolved material, and the filtrate acidified with hydrochloric acid to reprecipitate the 5-(p-acetamino-phenylsulfonamido) - 3 - isobutyl-isoxazole. The latter compound when crystallized from alcohol had a M. P. of 187–188° C.

The aceto compound was saponified with five times the amount of 3N sodium hydroxide solution for an hour at 95° C. and the solution was acidified with acetic acid. The 5-sulfanilamido-3-isobutyl-isoxazole was precipitated as an oil, which after standing, crystallized. The compound had a M. P. of 107–108° C.

EXAMPLE 9

5 - [3 - (3 - hydroxy - 4 - oxo - 1,4 - dihydro - 7 - sulfo - 1 - naphthylidene - amino) - 4 - methoxy - phenylsulfonamido] - 3,4 - dimethyl - isoxazole potassium salt 9 grams of 5-(3-amino-4-methoxy-phenylsulfonamido)-3,4-dimethyl - isoxazole were dissolved in concentrated hydrochloric acid and 100 cc. of water at 70° C. The resulting solution was dropped into a sludge of 15 grams of 1,2-naphthoquinone- 4,6-disulfonic acid dipotassium salt in 150 cc. of water. 5 cc. of hydrogen peroxide ( 30 per cent by volume) and 20 cc. of ice water were added and stirring was continued for three hours. The reaction mixture was then filtered and washed with ice water. The product thus obtained is the above-entitled compound. The compound forms violet brown crystals. It dissolves in water, forming a brown-colored solution.

The 5 - (3 - amino - 4 - methoxy - phenylsulfonamido)-3,4-dimethyl-isoxazole was prepared in the following manner:

54 grams of 4-methoxy-3-acetamido-benzenesulfonyl chloride were added with external cooling and stirring to 50 cc. of pyridine. There were then added 22.4 grams of 5-amino-3,4-dimethyl-isoxazole. The temperature of the mixture rose to 50–60° C. It was then stirred for two hours at 60–70° C., drowned in cold water, acidified with 50 cc. of concentrated hydrochloric acid, and stirring continued for six hours. The crude 5-(3-acetamino-4-methoxy-phenylsulfonamido)-3,4-dimethyl-isoxazole was recrystallized from 200 cc. of glacial actic acid and 200 cc. of water. The crystalline compound had a M. P. of 193–196° C. 23.5 grams of this compound were refluxed for two hours with a solution of 20 grams of sodium hydroxide in 200 cc. of water. The clear solution was neutralized with hydrochloric acid whereupon the 5 - (3 - amino - 4 - methoxy - phenylsulfonamido)-3,4-dimethyl-isoxazole precipitated in colorless crystals, M. P. 145–146° C.

I claim:
1. A compound which is represented by the following formula:

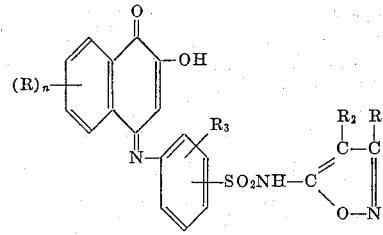

wherein R is a member of the group consisting of hydrogen and a sulfo radical, $n$ being selected from the group consisting of 1 and 2, $R_1$ and $R_2$ are members of the class consisting of hydrogen and lower alkyl, at least one of $R_1$ and $R_2$ being lower alkyl, and further members wherein $R_1$ and $R_2$ jointly stand for tetramethylene, and $R_3$ is a member of the group consisting of hydrogen and lower alkoxy.

2. 5 - [$N^4$ - (3 - hydroxy - 4 - oxo - 1,4 - dihydro - naphthylidene) - sulfanilamido] - 3,4 - dimethyl-isoxazole.

3. 5 - [$N^4$ - (3 - hydroxy - 4 - oxo - 1,4 - dihydro - 7 - sulfo - 1 - naphthylidene) - sulfanilamido]-3,4-dimethyl-isoxazole alkali metal salt.

4. 5 - [$N^4$ - (3 - hydroxy - 4 - oxo - 1,4 - dihydro - 7 - sulfo - 1 - naphthylidene) - sulfanilamido]-3,4-dimethyl-isoxazole potassium salt.

5. 5 - [$N^4$ - (3 - hydroxy - 4 - oxo - 1,4 - dihydro - 5,7 - disulfo - 1 - naphthylidene) - sulfanilamido]-3,4-dimethyl-isoxazole alkali metal salt.

6. 5 - [$N^4$ - (3 - hydroxy - 4 - oxo - 1,4 - dihydro - 5,7 - disulfo - 1 - naphthylidene) - sulfanilamido]-3,4-dimethyl-isoxazole disodium salt.

7. 5 - [$N^4$ - (3 - hydroxy - 4 - oxo - 1,4 -dihydro - 6 - sulfo - 1 - naphthylidene) - sulfanilamido]-3,4-tetramethylene-isoxazole alkali metal salt.

8. 5 - [$N^4$ - (3 - hydroxy - 4 - oxo - 1,4 - dihydro - 6 - sulfo - 1 - naphthylidene) - sulfanilamido]-3,4-tetramethylene-isoxazole potassium salt.

9. 5 - [3 - (3 - hydroxy - 4 - oxo - 1,4 - dihydro - 7 - sulfo - 1 - naphthylidene - amino) - 4 - methoxy - phenylsulfonamido] - 3,4 - dimethyl-isoxazole potassium salt.

NORBERT STEIGER.

REFERENCES CITED

The following references are of record in the file of this patent:

UNITED STATES PATENTS

| Number | Name | Date |
|---|---|---|
| 2,430,094 | Wuest et al. | Nov. 4, 1947 |

FOREIGN PATENTS

| Number | Country | Date |
|---|---|---|
| 68,411 | Norway | Oct. 16, 1944 |